May 27, 1958
C. A. ELSEY
2,836,190
MULTIPLE VALVE
Filed Dec. 8, 1952
3 Sheets-Sheet 1
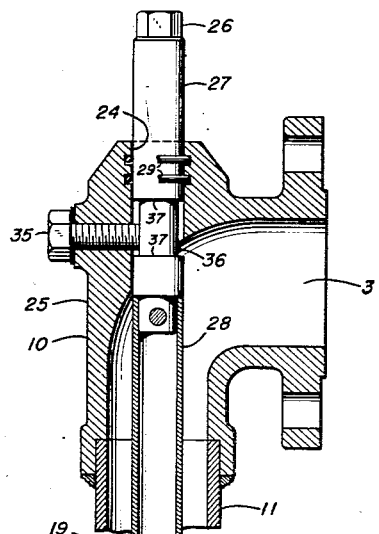
FIG. 1
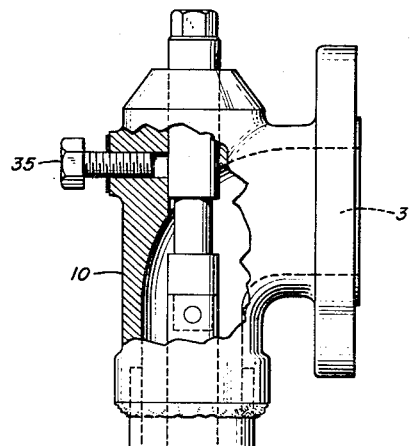
FIG. 2
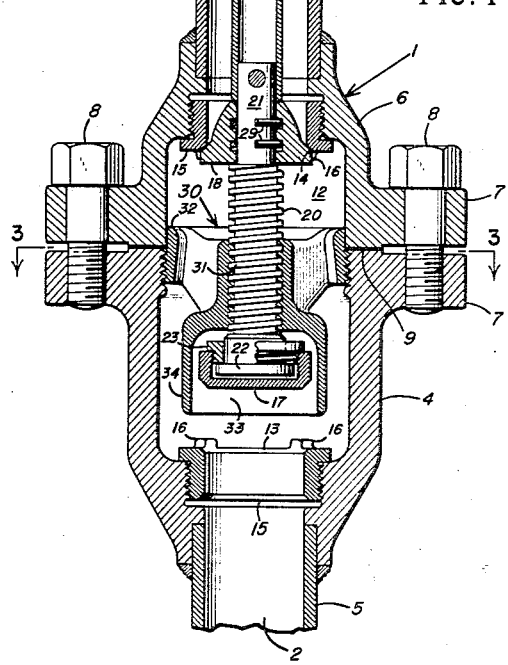
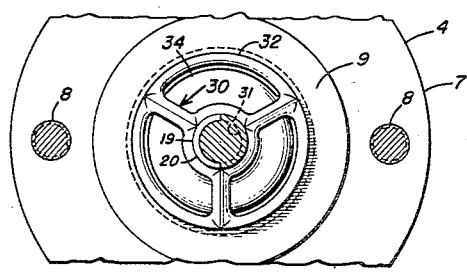
FIG. 3
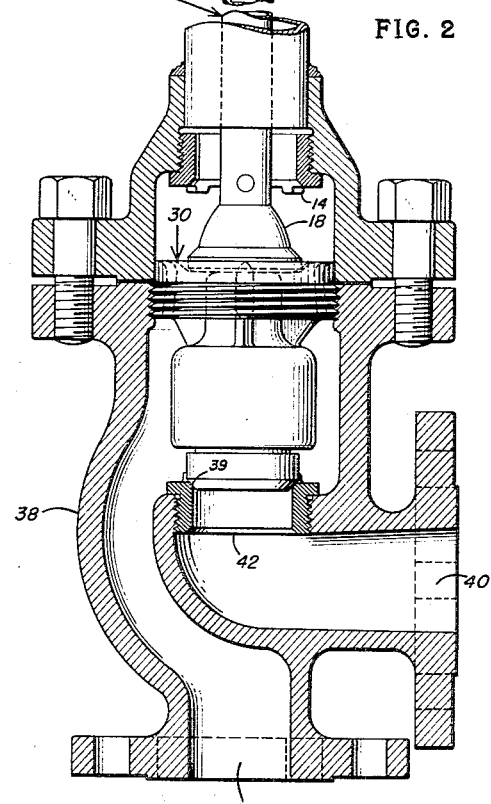
Inventor:
Cleo A. Elsey
By Wilmer Mechlin
his Attorney

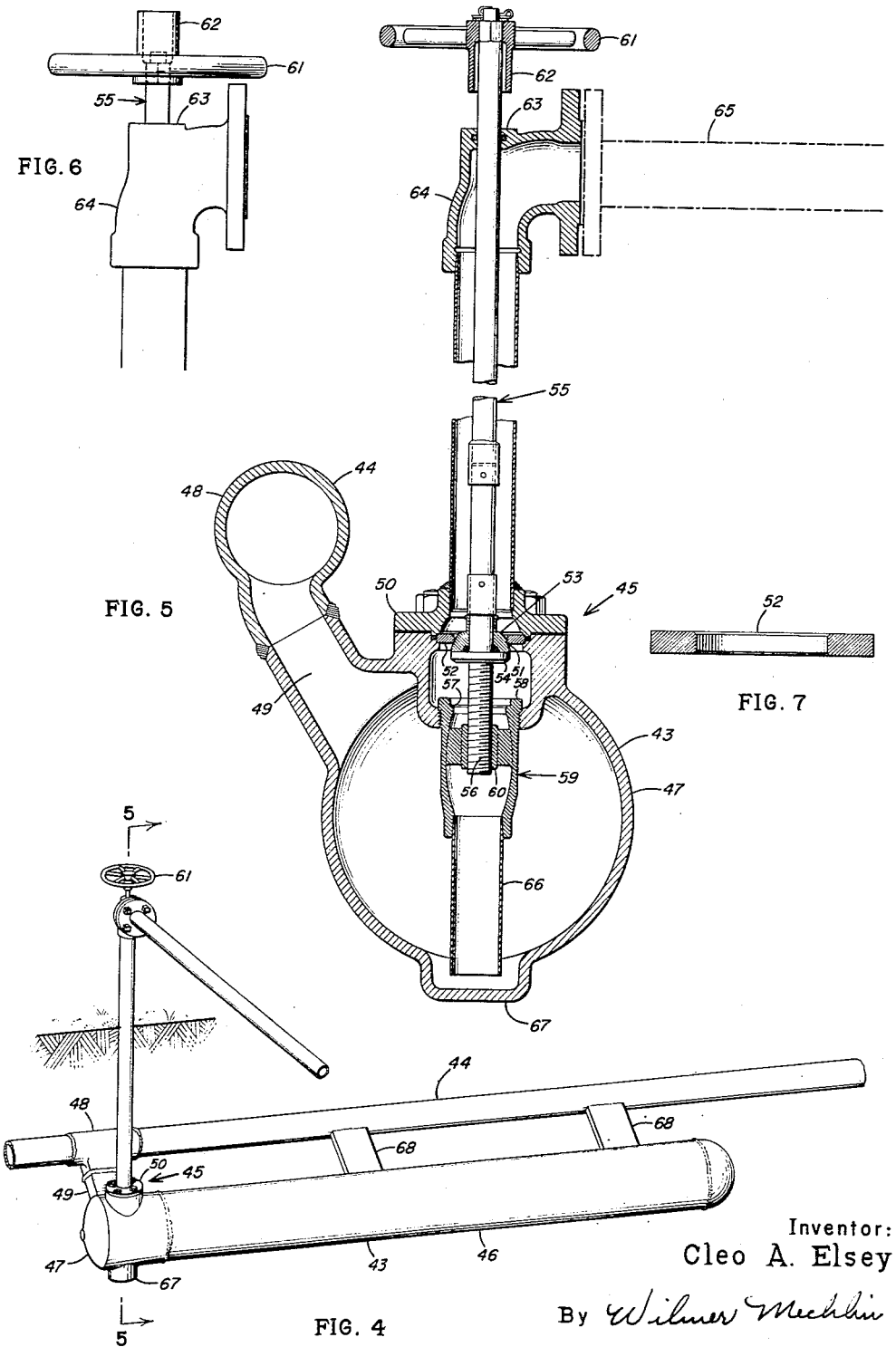

May 27, 1958
C. A. ELSEY
2,836,190
MULTIPLE VALVE
Filed Dec. 8, 1952
3 Sheets-Sheet 3
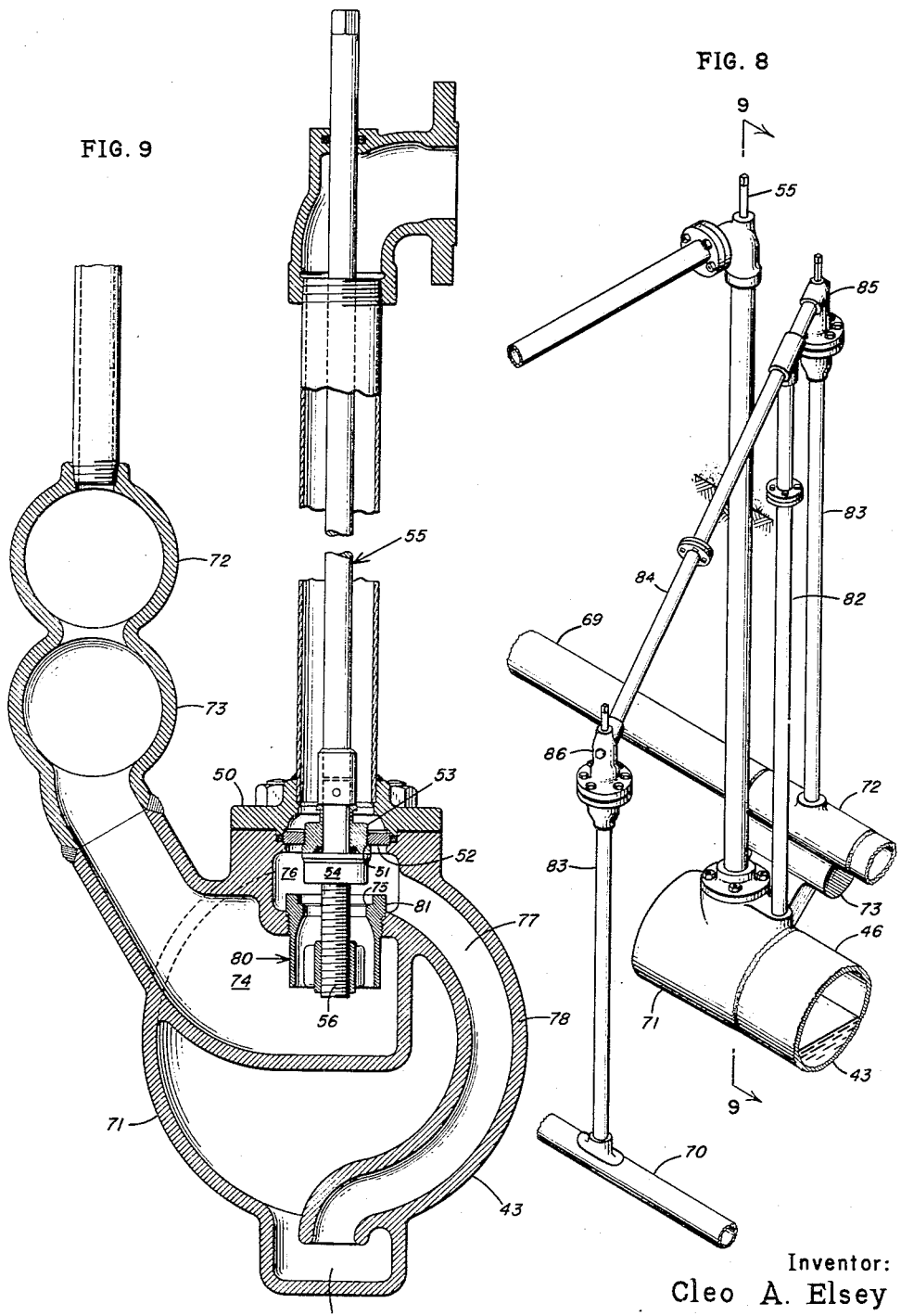
Inventor:
Cleo A. Elsey
By Wilmer Mechlin
his Attorney United States Patent Office 2,836,190
Patented May 27, 1958

2,836,190

MULTIPLE VALVE

Cleo A. Elsey, Bartlesville, Okla.

Application December 8, 1952, Serial No. 324,792

8 Claims. (Cl. 137—156)

This invention relates to valves and more particularly to multiple valves in which a plurality of spaced globe valves and cooperating valve seats are included in the same valve body.

In valving fluids and especially in throttling or regulating the flow of fluids, the wear on the throttling valve or its seat necessitates replacement at periodic intervals. At such time the fluid must, of course, be cut off in advance of the valve. A number of valves have been proposed in which an auxiliary valve is incorporated in the same valve body with the throttling valve, the auxiliary valve being adapted to seat, usually by fluid pressure, and cut off the flow of fluid during repair or replacement of the throttling valve. Despite the asserted efficacy of such auxiliary valves, it remains the general practice to employ a separate cut-off valve, wherever a throttling valve is used, to cut off the flow in the line. Initially satisfactory, the actuating mechanisms of such separate cut-off valves tend to freeze in open postiion because of their long periods of non-use, with the result that cut-off valves for industrial applications generally are provided with cam or like means for freeing them for use.

An object of the invention is to provide an improved multiple globe valve having throttling and cut-off valves disposed between their respective valve seats and a separable valve body, a section of the body being removable on cutting off of the flow of fluid through the valve by the cut-off valve, for exposure and repair or replacement of the throttling valve or its seat.

Another object of the invention is to provide an improved multiple globe valve having a multi-part body, a pair of valve seats each connected to one of the parts of the body and a pair of valves between and selectively seatable in the valve seats, in which one of the valve seat-connected parts is separable from the remainder of the body for exposing and enabling the connected valve seat and associated valve to be removed from the remainder of the valve body for repair or replacement, as necessary.

A further object of the invention is to provide an improved combined throttling and cut-off globe valve in which the valve elements have a common actuating member and means are provided for rendering the cut-off valve element normally inoperative to prevent accidental operation thereof during operation of the throttling valve.

Another object of the invention is to provide a drainage system for gas transmission lines of either the pressure or the vacuum type, wherein a drain tank serves as part of the valve body of a multiple globe valve unit such as described, and the valve unit serves to connect the drain tank, alternately, to the transmission line for drainage and to a vent for discharging the contents of the tank into a burn pit.

Other objects and advantages of the invention will appear hereinafter in the detailed description, be particularly pointed out in the appended claims, and be illustrated in the accompanying drawings, in which:

Figure 1 is a longitudinal sectional view of a two-way valve embodying the invention.

Figure 2 is a longitudinal sectional view of the valve unit of Figure 1 employed with a different lower valve body portion of a three-way mixing valve.

Figure 3 is a fragmentary horizontal sectional view taken along the lines 3—3 of Figure 1.

Figure 4 is a perspective view of a drainage system for pressure lines.

Figure 5 is a sectional view on an enlarged scale taken along the lines 5—5 of Figure 4, showing a modified form of the multiple valve of Figure 1.

Figure 6 is a fragmentary side elevational view of the upper portion of the valve of Figure 5 with the handle reversed for operation of the cut-off valve.

Figure 7 is a vertical sectional view on an enlarged scale showing the reversability of the valve seat of the upper valve of Figure 5.

Figure 8 is a fragmentary perspective view showing a valve system for draining a vacuum line; and Figure 9 is a vertical sectional view on an enlarged scale taken along the lines 9—9 of Figure 8.

Utilizing a pair of valves having a common actuating member and so arranging these valves that one or both may serve as either a throttling valve or a cut-off valve, depending on the valve body which it employs, the improved multiple valve of the present invention has numerous applications. Two such are illustrated in Figures 4–9, both drainage systems for gas transmission lines, in one of which the main fluid line is under pressure and in the other of which it is under vacuum. The valves of Figures 1 and 2 illustrate the two general forms of the multiple valve, Figure 1, a two-way valve and Figure 2, a three-way valve. While the several valves may be horizontally, vertically or obliquely disposed without changing their structure or mode of operation, all are shown as vertical and will be so described.

Referring now in detail to the drawings in which like reference characters designate like parts, and first to the two-way valve of Figure 1, the improved multiple globe valve there shown is comprised of a valve body or casing 1 having an inlet port 2 and an outlet port 3, the valve body being separable and formed of a lower part or section 4, welded, bolted, screwed or otherwise connected to an inlet line 5, and an upper part or section 6. The upper body section 6 is separable or removable from the lower section 4 and is joined thereto by a suitable separable connection, such as the illustrated peripheral flanges 7 and connecting bolts 8, a gasket 9 being inserted between the two sections to render the joint fluid-tight. One or the other, here, the upper section 6 may be connected to the adjoining pipe (not shown) through an L or elbow 10 which may be either separate from or integral with the upper section. In the illustrated embodiment the upper section 6 and L 10 are connected by an extension 11 in the form of a pipe or tube, to the opposite ends of which each section is welded or otherwise secured. Such an extension will ordinarily be used for underground valve installations to enable the valve body, proper, to be buried below the frost line so that cold weather will not interfere with its operation.

Within the valve body 1 and interposed between the inlet and outlet ports, 2 and 3, and the central enlarged substantially cylindrical bore or valve chamber 12, are two axially aligned spaced confronting or facing valve seats, one, or the lower, 13, for the inlet port, in the lower section 4 and the other, or upper, 14, for the outlet port 3, in the upper section 6. These valve seats may be integral with their respective sections of the valve body, but preferably are made removable so as to permit their removal for repair or replacement. In the illustrated embodiment each of the valve seats 13 and 14 is formed in a seat member or insert 15 threadedly engaging the valve body and actuatable for insertion or removal through axially projecting lugs 16, the valve seat, itself, being beveled in the usual fashion. Cooperating with valve seats 13 and 14 are a pair of opposed globe valves or valve members or elements, one, 17, being seatable in the lower valve seat 13, and the other, 18, in the upper valve seat 14. The valves 17 and 18 are actuated by a common actuating member, stem or spindle, 19, on which they are mounted in axially fixed positions, the actuating member here having, between the valves, an externally threaded portion 20, terminating at the upper valve 18 in a smooth stem 21 of restricted cross-section with which the upper valve has a sliding fit. Forming the lower end of the threaded portion 20 is a flange or shouldered element 22 which may be integral with or pinned or otherwise secured to the actuating member, the shouldered element slidably receiving and supporting an externally threaded collar 23 by which the valve, proper, or seating element 17 is removably secured to the actuating member.

For operating the valve the actuating member 19 projects from the valve body and may conveniently extend through a hole or opening 24 drilled in the wall 25 of the L 10, ending, above the L, in a hex or like actuating head 26. To enable the valve to be buried at different depths, depending on the frost line, the stem 21 of the actuating member 19, above the upper valve 18, like the upper section of the valve body, is preferably formed in two parts, the upper part 27 of the stem, mounting or carrying the actuating head 26, being connected to the main portion 21 by an extension, such as the sleeve 28, the latter being pinned or otherwise fixed to the two parts. For rendering fluid-tight the sliding fit between the upper part 27 of the stem and the opening 24 in the L 10, as well as the fit between the main part 21 of the stem and the upper valve 18, suitable packing is used, such as the illustrated O-rings 29.

As shown, the valves 17 and 18 are included by and move between their respective valve seats 13 and 14. The spacing between the valves is less than that between their valve seats so that when one valve is open the other valve is closed, and vice versa. The valves may, of course, be moved in and out of their valve seats by a sliding or reciprocating action of the actuating member 16 under control of bellows or similar means if automatic operation is desired. The form illustrated is designed for hand operation, for which purpose it is provided with the aforementioned threaded portion 20 and the actuating head 26. The reactance against which the threaded portion acts so as to shift the valves axially on rotation of the actuating member 19, is a spider 30 having a threaded axial bore 31 receiving the threaded portion 20 and either formed integrally or, as shown, having a screw fit with the lower section 4 of the valve body 1, through the external threading of its outer ring 32. To minimize interference with the flow of fluid through the valve under normal operating conditions, the bore 31 of the spider 30 merges at its lower extremity with an enlarged recess 33 formed in a hood 34, integral with the spider 30, in which the lower valve 17 is normally enclosed.

Having but one inlet and one outlet, the valve of Figure 1 is designed to serve as a throttling valve through its upper valve 18 with the lower valve 17 acting as a cut-off or shut-off valve when the upper valve or its seat 14 becomes worn and requires replacement. At that time the actuating member 19 will be turned or screwed down until the lower valve is seated and the flow of fluid into the valve through the inlet port 2, is cut off. The upper section 6 of the valve body can then be detached or unbolted from the lower section 4 and, after the L 10 has been disconnected from the adjoining pipe (not shown), the upper section and L can be slid as a unit off the actuating member, exposing both the upper valve 18 and its seat 14. The valve and its seat being above or downstream of the actuating thread 20, the replacement of either can then be accomplished without disturbing the seating of the cut-off valve 17. Such replacement will, of course, be required only at infrequent intervals. In the interim, it is desirable to render the shut-off valve inoperative so that movement of the throttling or upper valve 18 away from its valve seat will progressively increase, rather than ultimately cut off, the flow of fluid. This is accomplished in the illustrated embodiment by the provision of a set screw 35 threaded through the wall 25 of the L 10 normal to the upper stem 27 of the actuating member 19 and projecting or extending into a neck portion 36 on the stem of reduced diameter. The length of this neck portion between the defining shoulders 37 is determined by the extent of movement of the throttling valve 18 between full closed and full open positions, so that the set screw 35, when set, correspondingly limits the axial movement of the actuating member and blocks out or renders inoperative the cut-off valve 17. It is then only necessary to withdraw the set screw 35 sufficiently to free the shoulders 37 to render the cut-off valve operative.

In the valve of Figure 2, the valve unit of Figure 1 has been adapted to a three-way valve. Utilizing the same two upper and lower valves, 18 and 17, actuating member 19, upper body section 6, and spider 30, as the two-way valve of Figure 1, the three-way valve of Figure 2 replaces the single port lower body section 4 of the first valve with a two-port lower body section 38.

In essence, this valve makes provision for the regulated valving of two of its ports by the valves 14 and 15 and utilizes the third port as a common inlet or outlet. It thus may be used either to mix fluids entering from two inlets or to distribute one fluid between two outlets.

Using as the upper body section of the valve, the section 6 with its single port 3 throttled by the upper valve 18, the lower body section 38 will have its ports so arranged that one is throttleable by the lower valve 17. To this end, the lower section 38 has a valve seat 39 for one port 40 aligned with the lower valve 17 and has its second port 41 open at all times to the valve chamber between the valve seats. The valve seat 39 may be formed in the illustrated threaded insert or seat member 42 and the lower section 38 may be bolted or otherwise removably or separably secured to the upper body section 6. As in the valve of Figure 1, the spider 30 may be integral or, as shown, have a screwed connection with the lower section 38.

One other difference between the valves of the second and first figures is that the set screw 35 of the former will normally be in inoperative position so that the lower valve 17 can be moved at will to full closed position. This will apply except for operations in which full flow from or to two of the three ports is desired under normal conditions.

With the valve operable either automatically or, as shown, manually and the relative spacings between the valves and their seats such that either valve will be full open when the other is closed and, preferably, such that both valves can be full open simultaneously, the valve operates in this fashion. As a mixing valve with the valved ports 3 and 40 each serving as the inlet from one of the two fluid lines (not shown) to which the valve body is bolted or otherwise connected and the port 41 the common outlet, the mixture will ve varied depending upon the positions of the valves, as determined by the actuating member 19. Thus, in the position illustrated, there would be full flow from the port 3 and none from the port 40. On shifting the actuating member upwardly, the flow from the port 40 would gradually increase until full flow from both ports was obtained. Further upward movement of the actuating member would then progressively decrease the flow from the port 3 until this port was shut off, full flow then being obtained from the port 40.

As a distributing valve, the valve operates similarly, enabling the flow from the common inlet port 41 to be divided equally between the valved outlet ports, 3 and 40, or to be throttled through or shut off entirely from one of the outlet ports.

In Figures 4–7 there is shown the adaptation of a modified form of the valve unit of Figures 1 and 2 to a pressure drip system, such as is employed with a pressure transmission line for gases or liquids. Such fluid transmission lines, as laid, will have low points or "lows" at intervals at which collects moisture and other residue which separates from the fluid during transmission. At each of these lows is provided a drip tank into which the residue drains. Periodically, the accumulated residue is blown from the tank into a "burn pit" where it is burned.

It is now the common practice to employ two separate valves in pressure drips, one a throttling valve for regulating the blowing-off or discharge of the drip tank by the pressure in the gas line and the other, a shut-off valve for cutting off the pressure in the line when repair or replacement of the throttling valve is necessary. The illustrated pressure drip system combines the two valves into one and so correlates their actuation that the shut-off valve cannot "freeze" open through non-use over extended periods.

In the pressure drip system shown a drip tank 43 is connected to a low of a gas transmission line 44, and provided with a multiple two-way globe valve 45. For convenience in installation the tank has a body portion 46 separate from and welded, when installed, to a head portion 47, the latter serving both to connect the tank to the gas line and as the lower body section of the multiple valve 45. The head portion 47 may be connected to the gas line through a T 48 welded in the gas line and in turn welded to a throat 49 projecting from the head portion.

The valve 45, itself, is essentially the same as the valve of Figure 1 but is modified in several respects. Thus, while having an upper valve body section 50 separably connected, as by bolting, to the lower body section or head portion 47, the upper valve seat 51 is in the form of a reversible disk 52 having a valve seat on either face and locked in place between the upper and lower sections, 50 and 47, of the valve body. Too, the upper and lower valves or valve members, 53 and 54, respectively, are mounted back-to-back on the actuating stem, rod or member 55 and the actuating thread or threaded portion 56 of the actuating member is below and upstream of both valves. The lower valve seat 57 is removably secured to the lower body section 47. However, here, it is formed as part of an elongated outer annular ring 58 of a spider 59, the central axial boss 60 of which is internally threaded for threadedly engaging the threaded portion 56 of the actuating member 55.

Another difference between the valves is in the stop by which the lower or shut-off valve 54 is normally blocked out or rendered inoperative. In place of a set screw, the valve of the drip system utilizes a reversible handle 61 having an axially disposed collar or annular flange 62 projecting from one side and adapted, when turned down, to abut a shoulder 63 on the L 64 forming the upper extremity of the valve body. With the collar 62 turned down, the lower valve 54 is inoperative. With it turned up, the valve can be seated to block off the gas line for replacement of the throttling valve 53 or reversal of its seat 51.

As previously mentioned, the residue from the gas line 44 will ordinarily drain into the drip tank 43, the throttling valve 53 then being closed to disconnect an aboveground outlet pipe 65, leading from the tank to a burn pit (not shown). In blowing off the tank, the throttling valve 53 is opened until the residue, under controlled flow, has been expelled from the tank into the burn pit. To ensure that substantially all of the residue is expelled, the throttling valve is connected to the interior of the tank through a tube 66 suspended from the outer ring 58 of the spider 59 and extending into a well or sump 67 formed in the bottom of the head portion 47 of the tank. The head portion, in turn, is made the lowest part of the tank by securing the latter to the gas line through ribs or stringers 68, so that both have the same declination toward the low.

In Figures 8 and 9, the valve unit of Figures 4–7 has been adapted, with but minor modifications, to a three-way valve for valving a drip tank 43 of a vacuum gas transmission line 69. As applied to gas lines, the term "vacuum" connotes a pressure range from sub-atmospheric to slightly above atmospheric. Since this pressure is insufficient to blow off the drip tank, the necessary pressure is derived from a pressure line 70 which is laid down parallel to the transmission line and is connected to the drip tank whenever the latter is discharged.

The drip tank 43 of the illustrated vacuum system resembles that of the pressure system, having the same body 46 and welded construction but differing in the structure of its head portion 71. The head portion 71 is connected to the transmission line by a T 72 which is preferably double-headed with its lower cross-head 73 serving as an intermediate accumulator tank to facilitate drainage of the gas line. Since the T 72 is open to the gas line 69 provision must be made for blocking it from the interior of the drip tank 43, when the latter is discharged, to prevent the residue in the tank from being driven back into the transmission line. To this end the T 72 leads, within the head portion 71, to a compartment 74 which is separated, compartmented or walled off from the interior of the tank and is connected thereto through a valve seat 75 of the lower valve 54 of the valve unit described in connection with the pressure system of Figures 4–7. Beyond the valve seat 75, the connection is made through a valve chamber 76 and a passage 77, the latter being formed in the side wall 78 of the head portion 71 and terminating in a well or sump 79 open to the interior of the drip tank 43.

As in the multiple valve of the pressure system, the head portion 71 of the drip tank 43 is here used as the lower section of the valve body. The valve unit, itself, is substantially identical with that previously described, having the same separable upper body section 50, reversible-seat disk 52 for seating the upper valve 53, back-to-back mounting of the upper and lower valves, 53 and 54, on the common actuating member 55, and actuating thread 56 on the actuating member below or upstream of the valves. The spider 80 of the valve, also, is practically the same except that its outer ring 81 in which the lower valve seat is formed, is somewhat shortened, axially, as required by the sectioning or compartmenting of the head portion 71. A three-day valve, like that of Figure 2, the multiple valve of this embodiment dispenses with stop means for locking out the lower valve 54, since that valve must operate during discharge of the drip tank in the manner later described.

It has been mentioned that the pressure line 70 is connectable to the drip tank 43. The transmission line 69, as well, is made connectable to the tank and, preferably, is connected to it, except when the tank is being discharged. This connection normally maintains the tank at line pressure and avoids a pressure lock or back-pressure in the tank, with the consequent interference with drainage. The desired connections may be made through a common connecting pipe 82 upstanding from the head portion 71 and connected to the interior of the tank outside the drainage or inlet compartment 74. Each of the lines, in turn, may be connected to the common pipe 82 through a standpipe 83 and connecting piping 84, with an above-ground multiple valve similar to the valve of Figure 1, mounted on the upper end of the standpipe, for regulating the connection with the drip tank. These multiple valves are designated as 85 and 86 for the transmission line 69 and the pressure line 70, respectively.

With both the upper valve 53 leading to the burn pit (not shown) and the multiple valve 86 of the pressure line 70 closed and the multiple valve 85 of the transmission line 69 open, the residue from the gas will drain into the interior of the drip tank 43 through the compartment 74 and passage 77. To discharge the tank, the actuating member 55 is turned down to open the upper valve 53 and close the lower valve 54, the valve 85 in the transmission line 69 being shut off at the same time. The valve 86 in the pressure line 70 is then opened and the pressure line 70 is then opened and the pressure forces the contents of the drip tank up through the passage 77 and the upper valve seat 51 to the burn pit.

From the above detailed description it will be apparent that there has been provided an improved multiple globe valve having a valve unit in which a pair of valves are mounted on and actuated by a common actuating member, the valves shifting in unison or concert with the actuating member and being alternately seatable in their respective valve seats. It has been shown that by change in the lower section of the valve body, the valve unit can be made to serve either as a two-way or a three-way valve, in the former, enabling repair or replacement of its throttling valve without separate valving and in the latter, permitting either mixing or selective directing of fluids. Of particular value in drip sytsems for fluid transmission lines, in which it markedly simplifies the valving, the valve may be used as a by-pass for a motor valve unit and elsewhere, wherever its characteristics as either a two-way or a three-way valve are suited. It will therefore be understood that the described and disclosed embodiments are merely exemplary of the invention and that all modifications are intended to be included which do not depart from either the spirit of the invention or the scope of the appended claims.

Having described my invention, I claim:

1. A multiple valve comprising a valve body, a pair of spaced axially aligned valve seats in said valve body, a pair of valves each seatable in one of said seats, an actuating member shiftable axially relative to said body, said valves being carried by and shiftable in unison with said actuating member for alternately seating in their respective seats, and a reversible handle carried by said actuating member and having an axial collar projecting from one side and normally cooperating with said body for limiting axial movement of said actuating member in one direction relative thereto, said reversible handle normally rendering one of said valves inoperative to seat in its seat and on reversal rendering said one valve operative.

2. A multiple valve comprising a valve body, a pair of spaced confronting valve seats in said body, a pair of valves between and each seatable in one of said seats, an actuating member common to said valves, said actuating member including an externally threaded inner end portion and a sleeve portion partly overlapping and separable from said end portion, said valves being removably mounted on said end portion in axially fixed positions and alternately seatable thereby in their respective seats, at least one of said valves having a sliding fit with said end portion and being releasably locked thereto by said sleeve portion, said valve body being separable downstream of one of said valves for exposure of the other of said valves and its seat, and means threadedly engaging said end portion for holding said one valve seated and cutting off flow through said body during separation thereof.

3. A multiple valve comprising a valve body, a pair of spaced confronting valve seats in said body, a pair of valves between and each seatable in one of said seats, an actuating member common to said valves, said actuating member including an externally threaded inner end portion and a sleeve portion partly overlapping and separable from said end portion, said valves being removably mounted on said end portion in axially fixed positions and alternately seatable thereby in their respective seats, at least one of said valves having a sliding fit with said end portion and being releasably locked thereto by said sleeve portion, said valve body being separable downstream of one of said valves into outer and inner sections for exposure of the other of said valves and its seat, and a spider threaded into said inner section and threadedly engaging said end portion of said actuating member for holding said one valve seated and cutting off flow through said body during separation thereof.

4. A multiple valve comprising a valve body, a pair of spaced confronting removable valve seats in said body, a pair of valves between and each seatable in one of said seats, an actuating member common to said valves, said actuating member including an externally threaded inner end portion and a sleeve portion partly overlapping and separable from said end portion, said valves being removably mounted on said end portion in axially fixed positions and alternately seatable thereby in their respective seats, at least one of said valves having a sliding fit with said end portion and being releasably locked thereto by said sleeve portion, said valve body being separable downstream of one of said valves for exposure of the other of said valves and its seat, and means threadedly engaging said end portion for holding said one valve seated and cutting off flow through said body during separation thereof.

5. A multiple valve comprising a valve body, a pair of spaced confronting removable valve seats in said body, a pair of valves between and each seatable in one of said seats, an actuating member common to said valves, said actuating member including an externally threaded inner end portion and a sleeve portion partly overlapping and separable from said end portion, said valves being removably mounted on said end portion in axially fixed positions and alternately seatable thereby in their respective seats, at least one of said valves having a sliding fit with said end portion and being releasably locked thereto by said sleeve portion, said valve body being separable downstream of one of said valves into outer and inner sections for exposure of the other of said valves and its seat, and a spider formed integrally with one of said seats and threadable therewith into said inner section, said spider threadedly engaging said end portion of said actuating member for holding said one valve seated and cutting off flow through said body during separation thereof.

6. A drip system for a fluid transmission line comprising a drip tank having a connection to said line, a valve chamber integral with and opening outwardly onto a side of said tank, an outer valve body section removably mounted on said tank and covering an outer end of said chamber and having a port open to a burn pit, a pair of axially spaced valve seats removably mounted in said tank at opposite ends of said chamber and each interposed between said chamber and one of said connection and section, a pair of oppositely facing inner and outer valves in said chamber and shiftable axially between and each seatable in one of said seats, an actuating member common to said valves for shifting said valves in unison between said seats and selectively blocking said chamber from said transmission line by said lower valve and regulating flow through said chamber to said burn pit by said upper valve, said section on removal exposing the upper of said valves and associated of said seats, and means connected to said tank and cooperating with said actuating member for holding the lower valve seated during removal of said section.

7. A drip system for a pressure fluid transmission line comprising a drip tank having a connection to said line, a valve chamber integral with and opening outwardly onto a side of said tank, an outer valve body section removably mounted on said tank and covering an outer end of said chamber and having a port open to a burn pit, a pair of axially spaced valve seats removably mounted in said tank at opposite ends of said chamber and each interposed between said chamber and one of said connection and section, an actuating member extending through and shiftable axially of said valve seats, a spider in and removably connected to said tank and threadedly engaging said actuating member inwardly of said valve seats, and a pair of oppositely facing inner and outer valves in said chamber and shiftable axially between and each seatable in one of said seats, said valves being mounted on and shiftable axially of said chamber in unison by said actuating member for selectively blocking flow from said transmission line to said chamber by said inner valve and regulating flow through said chamber to said burn pit by said outer valve, said section on removal exposing the outer of said valves and associated of said seats.

8. A drip system for a vacuum gas transmission line having an associated pressure line comprising a drip tank having a connection to said transmission line, a compartment in said tank open to said transmission line, a valve chamber integral with and opening outwardly onto a side of said tank and having an inner end connected to said compartment, a passage connecting said chamber intermediate ends thereof to the interior of said tank, an outer valve body section removably mounted on said tank and covering an outer end of said chamber, a pair of axially spaced valve seats at opposite ends of said chamber and each interposed between said chamber and one of said compartment and section, an axially shiftable actuating member extending through said valve seats, a spider in and removably connected to said tank and threadedly engaging said actuating member inwardly of said valve seats, and a pair of oppositely facing inner and outer valves in said chamber and shiftable axially between and each seatable in one of said seats, said valves being mounted on and shiftable axially of said chamber in unison by said actuating member for alternately connecting said interior of said tank to said transmission line and said burn pit, said transmission and pressure lines being selectively connectable to said interior independently of said compartment, chamber and passage, and said section on removal exposing the upper of said valves and associated of said seats.

References Cited in the file of this patent

UNITED STATES PATENTS

| Number | Name | Date |
|---|---|---|
| 128,663 | Ross | July 2, 1872 |
| 538,502 | Byrne | Apr. 30, 1895 |
| 662,249 | Cadman | Nov. 20, 1900 |
| 737,273 | Raynolds | Aug. 25, 1908 |
| 1,064,565 | Thurber | June 10, 1913 |
| 1,200,668 | Swanberg | Oct. 10, 1916 |
| 1,302,567 | LaBour | May 6, 1919 |
| 1,464,303 | Whitlaw | Aug. 7, 1923 |
| 1,490,227 | Osborn | Apr. 15, 1924 |
| 1,843,382 | Branich | Feb. 2, 1932 |
| 1,925,958 | Giles | Sept. 5, 1933 |
| 2,008,375 | Wheaton | July 16, 1935 |
| 2,365,892 | McLeod | Dec. 26, 1944 |